US011427246B2

(12) United States Patent
Kawamura et al.

(10) Patent No.: US 11,427,246 B2
(45) Date of Patent: Aug. 30, 2022

(54) STEERING SYSTEM

(71) Applicant: JTEKT CORPORATION, Osaka (JP)

(72) Inventors: Hiroshi Kawamura, Okazaki (JP); Yuji Fujita, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 422 days.

(21) Appl. No.: 16/708,670

(22) Filed: Dec. 10, 2019

(65) Prior Publication Data

US 2020/0198694 A1 Jun. 25, 2020

(30) Foreign Application Priority Data

Dec. 21, 2018 (JP) .............................. JP2018-239459

(51) Int. Cl.
*B62D 5/04* (2006.01)
*B62D 6/10* (2006.01)

(52) U.S. Cl.
CPC ......... *B62D 5/0463* (2013.01); *B62D 5/0424* (2013.01); *B62D 6/10* (2013.01)

(58) Field of Classification Search
CPC ........ B62D 5/0463; B62D 6/10; B62D 6/008; B62D 5/049; B62D 5/0484; B62D 6/00
See application file for complete search history.

(56) References Cited

U.S. PATENT DOCUMENTS 4,448,275 A * 5/1984 Kitagawa ................ G01L 3/105
 73/862.331
5,568,389 A * 10/1996 McLaughlin ........ B62D 5/0463
 701/41
5,894,205 A * 4/1999 Shimizu ............... B62D 5/0463
 318/432

(Continued)

FOREIGN PATENT DOCUMENTS

CN 102395867 A * 3/2012 ............. B62D 5/049
CN 102656432 A * 9/2012 ........... B62D 5/0484
(Continued)

OTHER PUBLICATIONS

"Non-conduct steering sensor for Electric Power Steering;" Wang Xiaoling, Zhao Yan, Wang Hong; 2009 International Conference on Information and Automation (pp. 1462-1467); Jun. 1, 2009. (Year: 2009).*

(Continued)

*Primary Examiner* — Khoi H Tran
*Assistant Examiner* — Jorge O Peche
(74) *Attorney, Agent, or Firm* — Oliff PLC

(57) ABSTRACT

A steering system includes a prioritized torque sensor, a redundant torque sensor, a controller, a first signal line, a second signal line, and a common signal line. Each of the first signal line and the second signal line connects the prioritized torque sensor and the controller. The common signal line connects the redundant torque sensor and the controller. The prioritized torque sensor is configured to transmit, via the first signal line, a first prioritized detection signal. The prioritized torque sensor is configured to transmit, via the second signal line, a second prioritized detection signal. The redundant torque sensor is configured to transmit, via the common signal line, a first redundant detection signal and a second redundant detection signal.

6 Claims, 4 Drawing Sheets

(56) References Cited

U.S. PATENT DOCUMENTS

| | | | | |
|---|---|---|---|---|
| 6,152,254 | A * | 11/2000 | Phillips | B62D 5/065 180/421 |
| 10,202,145 | B2 * | 2/2019 | Kariatsumari | B62D 5/0472 |
| 11,208,143 | B2 * | 12/2021 | Kawamura | H02P 6/28 |
| 2001/0023383 | A1 * | 9/2001 | Ishihara | H02M 7/53873 180/443 |
| 2004/0182640 | A1 * | 9/2004 | Katou | B62D 5/049 180/446 |
| 2006/0069481 | A1 * | 3/2006 | Kubota | B62D 5/0463 701/41 |
| 2008/0294313 | A1 * | 11/2008 | Aoki | B62D 5/0463 701/43 |
| 2011/0218704 | A1 * | 9/2011 | Kanekawa | B62D 5/049 701/29.2 |
| 2012/0018241 | A1 * | 1/2012 | Shimizu | G01L 5/221 180/443 |
| 2012/0031202 | A1 * | 2/2012 | Goto | B62D 5/049 73/862.193 |
| 2012/0152647 | A1 * | 6/2012 | Uryu | G01L 25/003 702/41 |
| 2012/0271513 | A1 * | 10/2012 | Yoneda | B62D 5/0484 701/41 |
| 2013/0261886 | A1 * | 10/2013 | Aoki | G01L 3/10 702/41 |
| 2014/0041958 | A1 * | 2/2014 | Iijima | B62D 6/04 180/446 |
| 2014/0076654 | A1 * | 3/2014 | Yoshida | G01L 3/104 73/862.325 |
| 2014/0076655 | A1 * | 3/2014 | Yoshida | G01L 3/102 73/862.325 |
| 2014/0195117 | A1 * | 7/2014 | Kuwahara | G01L 3/105 73/862.331 |
| 2016/0332660 | A1 | 11/2016 | Sasaki et al. | |
| 2017/0050670 | A1 * | 2/2017 | Kuramitsu | G01L 25/003 |
| 2018/0093703 | A1 * | 4/2018 | Sasaki | B62D 5/049 |
| 2018/0304916 | A1 * | 10/2018 | Owaki | B62D 5/0409 |
| 2020/0023887 | A1 * | 1/2020 | Sasaki | B62D 5/0493 |
| 2020/0180689 | A1 * | 6/2020 | Asaka | G01D 3/08 |
| 2020/0198694 | A1 * | 6/2020 | Kawamura | B62D 5/049 |
| 2021/0291893 | A1 * | 9/2021 | Nozawa | B62D 15/029 |

FOREIGN PATENT DOCUMENTS

| | | | | |
|---|---|---|---|---|
| CN | 105026907 | A * | 11/2015 | B62D 5/0421 |
| CN | 106468606 | A * | 3/2017 | B62D 5/0463 |
| CN | 106061796 | B * | 8/2018 | B62D 5/046 |
| CN | 109073487 | A * | 12/2018 | B62D 15/0215 |
| DE | 10047949 | A1 * | 5/2001 | G01L 3/105 |
| DE | 102015204781 | A1 * | 3/2016 | B62D 5/0421 |
| EP | 2369317 | A1 * | 9/2011 | G01L 25/003 |
| EP | 3677488 | B1 * | 5/2021 | B62D 5/0424 |
| FR | 2830228 | A1 * | 4/2003 | B62D 6/10 |
| JP | 2004276697 | A * | 10/2004 | |
| JP | 5668504 | B2 * | 2/2015 | |
| JP | 2016-194488 | A | 11/2016 | |
| JP | 2017-229156 | A | 12/2017 | |
| JP | 2018095223 | A * | 6/2018 | |
| JP | 2020118599 | A * | 8/2020 | |
| JP | 2021132515 | A * | 9/2021 | |
| WO | WO-2012176358 | A1 * | 12/2012 | B62D 5/0481 |
| WO | WO-2014064856 | A1 * | 5/2014 | B62D 5/0463 |
| WO | WO-2020137858 | A1 * | 7/2020 | B60W 40/09 |
| WO | WO-2020170654 | A1 * | 8/2020 | |

OTHER PUBLICATIONS

"The Optimal Current Ratio Control of Redundant Electric Drive Systems and Diagnostic Strategies for Disagreement;" Youngwoo Noh, Wonkyu Kim, Ju Lee; IEEE Access (vol. 9, pp. 32115-32130); Jan. 1, 2021. (Year: 2021).*

"Model-based fault detection and isolation for electric power steering system;" Jeongjun Lee, Hyeongcheol Lee, Jihwan Kim, Jiyoel Jeong; 2007 International Conference on Control, Automation and Systems (pp. 2369-2374); Apr. 14, 2008. (Year: 2008).*

Jun. 5, 2020 extended Search Report issued in European Patent Application No. 19216027.3.

\* cited by examiner

STEERING SYSTEM

INCORPORATION BY REFERENCE

The disclosure of Japanese Patent Application No. 2018-239459 filed on Dec. 21, 2018 including the specification, drawings and abstract is incorporated herein by reference in its entirety.

BACKGROUND

1. Technical Field

The present disclosure relates to a steering system.

2. Description of Related Art

As a vehicle steering apparatus, there is an electric power steering system (EPS) configured to apply, to a steering mechanism, an assist torque for assisting a steering operation by using a motor as a drive source. In a general EPS, a torque sensor detects a steering torque input to the steering mechanism, and a motor torque to be applied as the assist torque is controlled based on the detected steering torque.

As the torque sensor, there is a torque sensor configured to detect the steering torque based on a twist of a torsion bar provided on a steering shaft. For example, a torque sensor described in Japanese Unexamined Patent Application Publication No. 2016-194488 (JP 2016-194488 A) includes a magnetic circuit and a sensor integrated circuit (IC). In the magnetic circuit, a magnetic flux changes depending on the twist of the torsion bar. The sensor IC includes a magnetic sensor such as a Hall element configured to detect the magnetic flux of the magnetic circuit. The sensor IC includes two detection units each including a magnetic sensor and an analog-to-digital (A/D) converter. Detection values that are based on magnetic fluxes detected by the respective detection units are transmitted to a controller (electronic control unit (ECU)) by being integrated into one detection signal. Then, the controller determines whether an abnormality occurs in the sensors based on the detection values. When no abnormality occurs, the steering torque is detected based on the detection values.

SUMMARY

In the configuration described above, the two detection values are transmitted by being integrated into one detection signal, and therefore the information amount of the detection signal increases, thereby increasing the time required to transmit the detection signal. Thus, the steering torque acquired by the controller may slightly deviate from a steering torque input at the moment of acquisition. That is, acquisition of the steering torque by the controller may be delayed. As a result, a steering feel attained by applying an assist torque based on this steering torque may not be optimum.

In view of the above, the respective detection units may output detection signals to shorten the times required to transmit the detection signals. In recent years, it is proposed that the EPS include a plurality of torque sensors for the purpose of achieving redundancy or the like (for example, Japanese Unexamined Patent Application Publication No. 2017-229156 (JP 2017-229156 A)). If the configuration in which the respective detection units output the detection signals is applied to the configuration in which the plurality of torque sensors are provided, the number of signal lines for transmitting the detection signals increases, thereby complicating the structure of the steering apparatus.

This problem may arise not only in the EPS, but also in a steer-by-wire steering apparatus in which power transmission between a steering portion and a steered portion is separated. For example, the problem may arise in a case where a steering operation torque for turning steered wheels is applied based on a steering torque or in a case where a reaction torque that is a force for resisting a driver's steering operation is applied.

The present disclosure provides a steering system in which a time required to acquire a steering torque can be shortened and structural complication can be suppressed while securing redundancy.

A steering system according to one aspect of the present disclosure includes a steering mechanism, a motor, a prioritized torque sensor, a redundant torque sensor, a controller, a first signal line, a second signal line, and a common signal line. The steering mechanism is configured to turn a steered wheel in response to a steering operation. The motor is configured to apply a motor torque to the steering mechanism. Each of the prioritized torque sensor and the redundant torque sensor is configured to detect a steering torque based on a twist of a torsion bar provided on a steering shaft of the steering mechanism. The prioritized torque sensor includes a first prioritized detector and a second prioritized detector each configured to output a prioritized detection value depending on the twist of the torsion bar. The redundant torque sensor includes a first redundant detector and a second redundant detector each configured to output a redundant detection value depending on the twist of the torsion bar. The controller is configured to control actuation of the motor based on the steering torque. Each of the first signal line and the second signal line connects the prioritized torque sensor and the controller. The common signal line connects the redundant torque sensor and the controller. The prioritized torque sensor is configured to transmit, via the first signal line, a first prioritized detection signal containing the prioritized detection value output from the first prioritized detector. The prioritized torque sensor is configured to transmit, via the second signal line, a second prioritized detection signal containing the prioritized detection value output from the second prioritized detector. The redundant torque sensor is configured to transmit, via the common signal line, a first redundant detection signal and a second redundant detection signal containing the redundant detection values output from the first redundant detector and the second redundant detector, respectively.

In the steering system according to the one aspect of the present disclosure, the first prioritized detection signal and the second prioritized detection signal are output from the prioritized torque sensor to the controller via the dedicated first signal line and the dedicated second signal line, respectively. Therefore, the time required to transmit the first prioritized detection signal and the second prioritized detection signal can be shortened as compared to a case where the first prioritized detection signal and the second prioritized detection signal are transmitted collectively through a single signal line. Thus, a time required to acquire a steering torque by the controller can be shortened.

When the steering torque is detected based on the first redundant detection signal and the second redundant detection signal output from the redundant torque sensor, that is, when an abnormality occurs in the prioritized torque sensor, a steering apparatus is used only in a limited period until the prioritized torque sensor is repaired or replaced. Therefore, shortening a time, which is required to acquire a steering torque, to optimize the steering feel is not required at a high level. In the configuration described above, the first redundant detection signal and the second redundant detection signal are output from the first redundant detector and the second redundant detector of the redundant torque sensor to the controller via the single common signal line. Thus, structural complication caused by an increase in the number of signal lines can be suppressed while securing redundancy.

In the steering system according to the one aspect of the present disclosure, an information amount of each of the prioritized detection values contained in the first prioritized detection signal and the second prioritized detection signal may be larger than an information amount of each of the redundant detection values contained in the first redundant detection signal and the second redundant detection signal.

In the steering system according to the one aspect of the present disclosure, the information amount of each of the prioritized detection values contained in the first prioritized detection signal and the second prioritized detection signal is large, and therefore the actuation of the motor can be controlled based on the highly accurate steering torque. When the information amount of each of the prioritized detection values increases, the time required to transmit the first prioritized detection signal and the second prioritized detection signal increases. By outputting the first prioritized detection signal and the second prioritized detection signal to the controller via the dedicated first signal line and the dedicated second signal line as in the configuration described above, respectively, a time required to acquire a steering torque detected by the prioritized torque sensor by the controller can be shortened.

In the steering system according to the one aspect of the present disclosure, each of the first prioritized detector, the second prioritized detector, the first redundant detector, and the second redundant detector may include a detection element and an A/D converter. The detection element is configured to output an analog value depending on the twist of the torsion bar. The A/D converter is configured to output a digital value obtained through A/D conversion of the analog value. The number of bits for quantizing the analog value by the A/D converter of each of the first prioritized detector and the second prioritized detector may be larger than the number of bits for quantizing the analog value by the A/D converter of each of the first redundant detector and the second redundant detector.

In the steering system according to the one aspect of the present disclosure, the information amount (resolution) of each of the prioritized detection values to be contained in the first prioritized detection signal and the second prioritized detection signal may be increased by increasing the number of bits for quantizing the analog value.

In the steering system according to the one aspect of the present disclosure, the controller may be configured to calculate a prioritized torque command value that is a target value of the motor torque based on the steering torque detected by the prioritized torque sensor. The controller may be configured to calculate a redundant torque command value that is a target value of the motor torque based on the steering torque detected by the redundant torque sensor. The controller may be configured to control the actuation of the motor so that the motor torque is a torque indicated by the prioritized torque command value or the redundant torque command value. The number of arithmetic processing operations for calculating the redundant torque command value by the controller may be smaller than the number of arithmetic processing operations for calculating the prioritized torque command value by the controller.

In the steering system according to the one aspect of the present disclosure, the time required to calculate the prioritized torque command value is longer than the time required to calculate the redundant torque command value. Thus, a time required to acquire a steering torque detected by the prioritized torque sensor by the controller can be shortened as in the configuration described above.

In the steering system according to the one aspect of the present disclosure, the controller may be configured to calculate a target steering torque that is a target value of the steering torque detected by the prioritized torque sensor. The controller may be configured to calculate a torque feedback component by executing torque feedback control for causing the steering torque detected by the prioritized torque sensor to follow the target steering torque. The controller may be configured to calculate the prioritized torque command value based on the torque feedback component.

In the steering system according to the one aspect of the present disclosure, the prioritized torque command value is calculated based on the torque feedback component obtained by executing the torque feedback control so that the actual steering torque follows the target steering torque. Therefore, the steering feel can be optimized by setting the steering torque to an optimum value. In the torque feedback control, the actual steering torque follows the target steering torque, and therefore a time required to acquire a steering torque detected by the prioritized torque sensor by the controller can be shortened as in the configuration described above.

In the steering system according to the one aspect of the present disclosure, a time required to acquire a steering torque can be shortened and the structural complication can be suppressed while securing redundancy.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
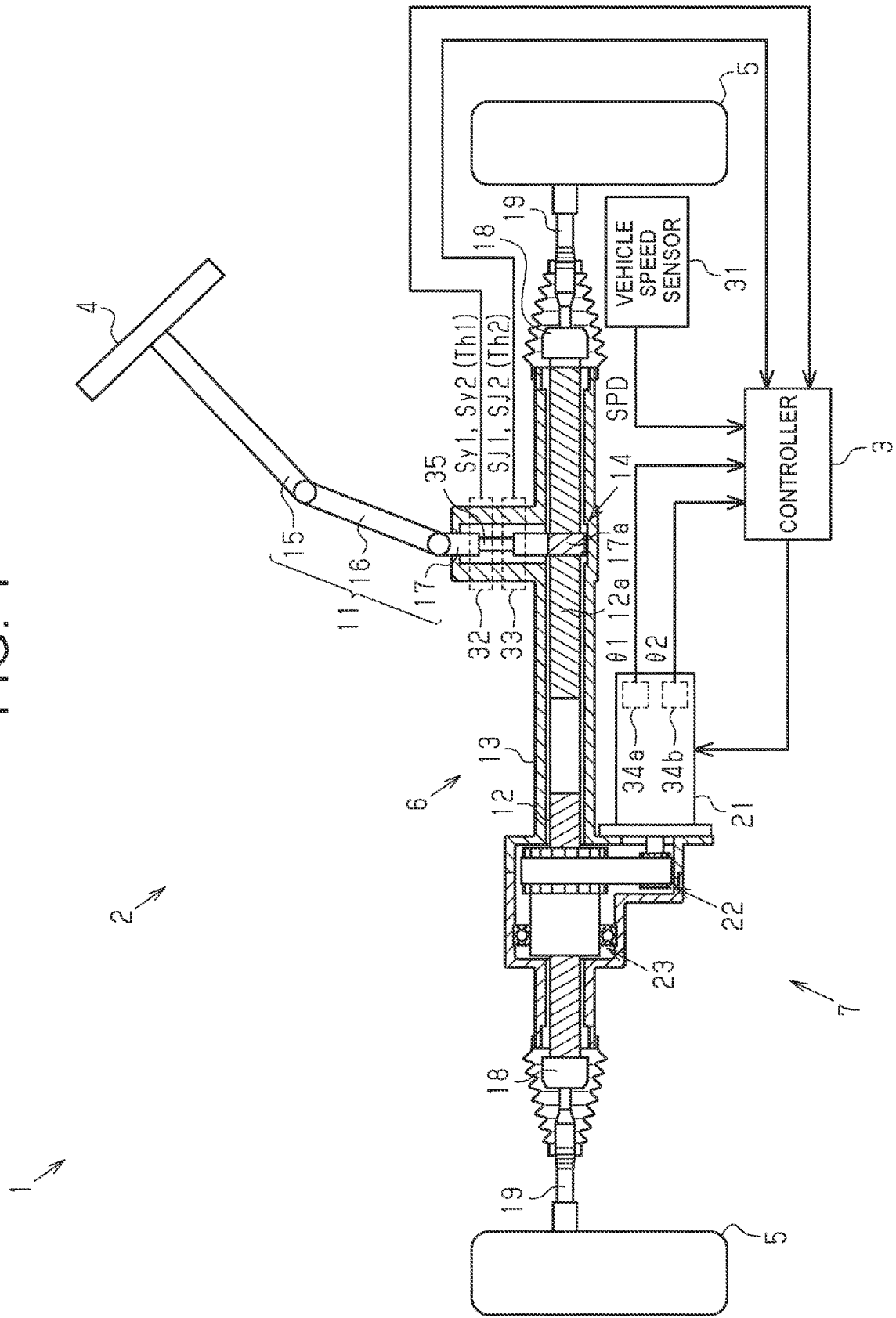
FIG. 1 is a schematic configuration diagram of a steering system.

A steering system according to one embodiment is described below with reference to the drawings. As illustrated in FIG. 1, a steering system 1 includes a steering apparatus 2 and a controller 3. The steering apparatus 2 is constructed as an electric power steering system (EPS). The controller 3 controls the steering apparatus 2. The steering apparatus 2 includes a steering mechanism 6 and an actuator 7. The steering mechanism 6 turns steered wheels 5 based on a driver's operation for a steering wheel 4. The actuator 7 applies, to the steering mechanism 6, a motor torque as an assist torque (assist force) for assisting a steering operation.

The steering mechanism 6 includes a steering shaft 11, a rack shaft 12, a cylindrical rack housing 13, and a rack and pinion mechanism 14. The steering wheel 4 is fixed to the steering shaft 11. The rack shaft 12 serves as a steering operation shaft coupled to the steering shaft 11. The rack shaft 12 is inserted through the rack housing 13 in a reciprocable manner. The rack and pinion mechanism 14 converts rotation of the steering shaft 11 into reciprocating motion of the rack shaft 12. The steering shaft 11 is constructed by coupling a column shaft 15, an intermediate shaft 16, and a pinion shaft 17 in order from a side where the steering wheel 4 is located.

The rack shaft 12 and the pinion shaft 17 are arranged in the rack housing 13 at a predetermined crossing angle. The rack and pinion mechanism 14 is constructed such that rack teeth 12a formed on the rack shaft 12 mesh with pinion teeth 17a formed on the pinion shaft 17. Tie rods 19 are pivotably coupled to both ends of the rack shaft 12 via rack ends 18 formed of ball joints provided at axial ends of the rack shaft 12. The distal ends of the tie rods 19 are coupled to knuckles (not illustrated) to which the steered wheels 5 are attached. In the steering apparatus 2, rotation of the steering shaft 11 along with the steering operation is converted into axial movement of the rack shaft 12 by the rack and pinion mechanism 14. The axial movement is transmitted to the knuckles via the tie rods 19. Thus, the steered angle of each of the steered wheels 5, that is, the traveling direction of a vehicle is changed.

The actuator 7 includes a motor 21, a transmission mechanism 22, and a conversion mechanism 23. The motor 21 is a drive source. The transmission mechanism 22 transmits rotation of the motor 21. The conversion mechanism 23 converts the rotation transmitted via the transmission mechanism 22 into reciprocating motion of the rack shaft 12. The actuator 7 transmits the rotation of the motor 21 to the conversion mechanism 23 via the transmission mechanism 22, and converts the rotation into the reciprocating motion of the rack shaft 12 by the conversion mechanism 23, thereby applying a motor torque to the steering mechanism 6 as the assist torque. For example, a three-phase brushless motor is employed as the motor 21 of this embodiment. For example, a belt mechanism is employed as the transmission mechanism 22. For example, a ball screw mechanism is employed as the conversion mechanism 23.

The controller 3 acquires detection results from various sensors provided on the vehicle as pieces of information indicating a driver's request, a traveling condition, and a steering condition (condition amounts), and controls the motor 21 based on the condition amounts. Examples of various sensors include a vehicle speed sensor 31, a prioritized torque sensor 32, a redundant torque sensor 33, and rotation angle sensors 34a and 34b. The vehicle speed sensor 31 detects a vehicle speed SPD. The prioritized torque sensor 32 and the redundant torque sensor 33 are provided on the pinion shaft 17, and detect steering torques Th1 and Th2 input to the steering mechanism 6 based on a twist of the torsion bar 35, respectively. As described later, the prioritized torque sensor 32 outputs, to the controller 3, a first prioritized detection signal Sy1 and a second prioritized detection signal Sy2 for detecting the steering torque Th1, and the redundant torque sensor 33 outputs, to the controller 3, a first redundant detection signal Sj1 and a second redundant detection signal Sj2 for detecting the steering torque Th2. The rotation angle sensors 34a and 34b detect rotation angles θ1 and θ2 of the motor 21 as relative angles within a range of 360°, respectively. The rotation angles θ1 and θ2 basically take the same value when the rotation angle sensors 34a and 34b are normal. The steering torques Th1 and Th2 and the rotation angles θ1 and θ2 are detected as positive values when steering is performed in one direction (right in this embodiment), and as negative values when steering is performed in the other direction (left in this embodiment). The controller 3 supplies driving electric power to the motor 21 based on signals indicating the condition amounts input from the sensors, thereby controlling actuation of the actuator 7, that is, the motor torque to be applied to the steering mechanism 6 so that the rack shaft 12 reciprocates.

Figure 2:
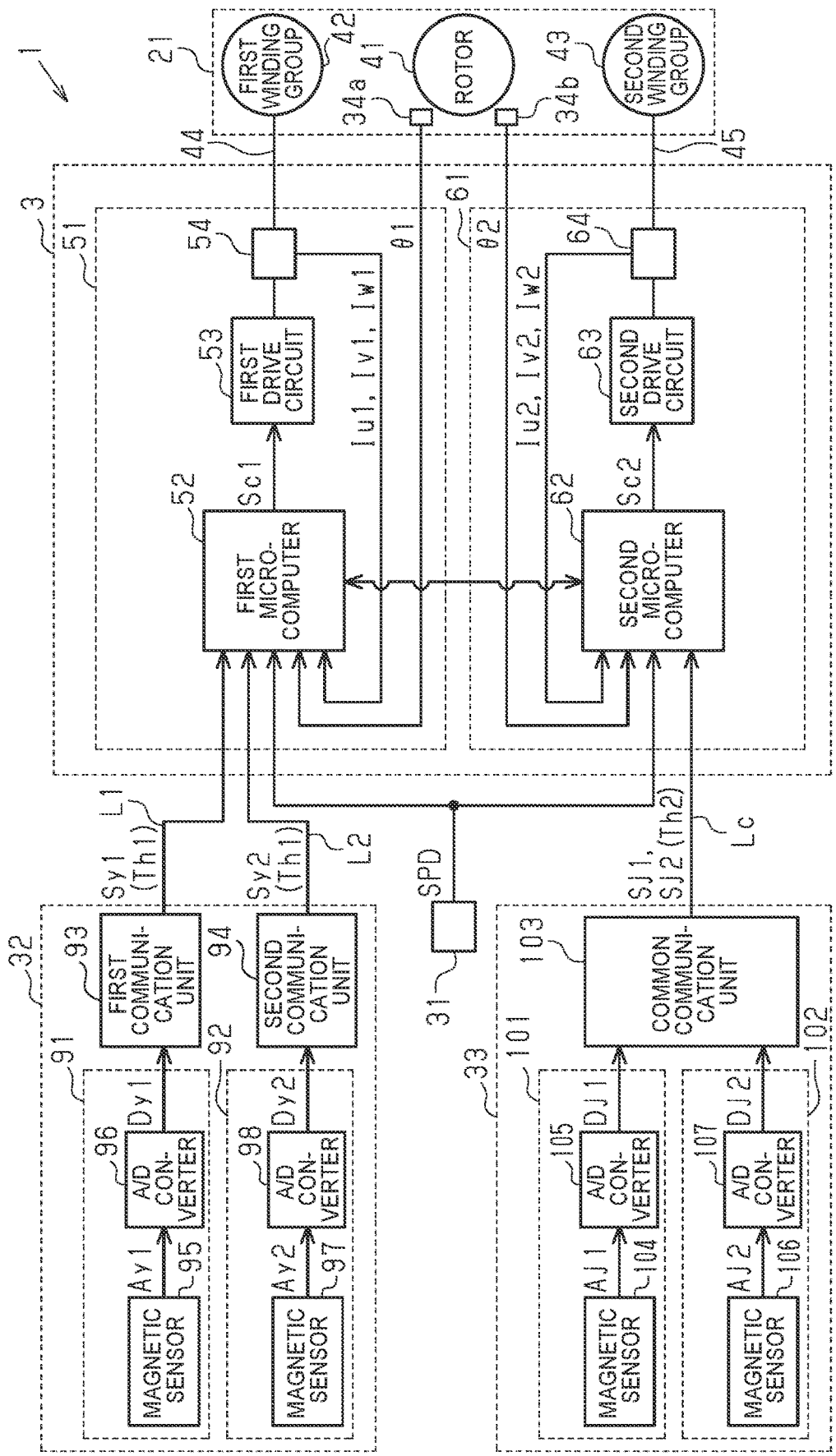
FIG. 2 is a block diagram illustrating the electrical configuration of the steering system.

Next, the configuration of the motor 21 is described. As illustrated in FIG. 2, the motor 21 includes a rotor 41, and a first winding group 42 and a second winding group 43 wound around a stator (not illustrated). Each of the first winding group 42 and the second winding group 43 includes coils of three phases that are U, V, and W phases. The first winding group 42 and the second winding group 43 have separate energization systems. The first winding group 42 is connected to the controller 3 via first connection lines 44. The second winding group 43 is connected to the controller 3 via second connection lines 45. For convenience of the description, FIG. 2 illustrates one collective first connection line 44 and one collective second connection line 45 for the respective phases.

Next, the configuration of the controller 3 is described. The controller 3 includes a first control unit 51 and a second control unit 61. The first control unit 51 serves as an individual control unit configured to control energization of the first winding group 42. The second control unit 61 serves as an individual control unit configured to control energization of the second winding group 43. The controller 3 independently controls the supply of the driving electric power to the first winding group 42 and the second winding group 43 for the respective energization systems. Each of the first control unit 51 and the second control unit 61 includes a central processing unit (CPU) and a memory (not illustrated), and executes various types of control such that the CPU executes a program stored in the memory in every predetermined calculation period.

Specifically, the first control unit 51 includes a first microcomputer 52 and a first drive circuit 53. The first microcomputer 52 outputs a first control signal Sc1. The first drive circuit 53 supplies the driving electric power to the first winding group 42 based on the first control signal Sc1. First current sensors 54 are connected to the first microcomputer 52. The first current sensors 54 detect actual current values Iu1, Iv1, and Iw1 of the respective phases that flow through the first connection lines 44 between the first drive circuit 53 and the first winding group 42. For convenience of the description, FIG. 2 illustrates one collective first current sensor 54 for the respective phases.

A known pulse width modulation (PWM) inverter is employed as the first drive circuit 53. In the PWM inverter, pairs of switching elements (for example, field effect transistors) connected in series are defined as basic units (arms), and the arms are connected in parallel in association with the coils of the respective phases. The first control signal Sc1 is a gate ON/OFF signal for defining ON/OFF states of the switching elements. The first drive circuit 53 turns ON or OFF the switching elements in response to the first control signal Sc1 to convert direct current (DC) power supplied from an on-board power supply (battery) (not illustrated) into three-phase alternating current (AC) power, and supplies the three-phase AC power to the first winding group 42 via the first connection lines 44. Thus, the first control unit 51 controls a torque to be generated in the first winding group 42 through the supply of the driving electric power to the first winding group 42.

The second control unit 61 is basically constructed similarly to the first control unit 51, and includes a second microcomputer 62 and a second drive circuit 63. The second microcomputer 62 outputs a second control signal Sc2. The second drive circuit 63 supplies the driving electric power to the second winding group 43 based on the second control signal Sc2. Second current sensors 64 are connected to the second microcomputer 62. The second current sensors 64 detect actual current values Iu2, Iv2, and Iw2 of the respective phases that flow through the second connection lines 45 between the second drive circuit 63 and the second winding group 43. For convenience of the description, FIG. 2 illustrates one collective second current sensor 64 for the respective phases.

A known PWM inverter is employed as the second drive circuit 63 similarly to the first drive circuit 53. The second control signal Sc2 is a gate ON/OFF signal for defining ON/OFF states of switching elements. The second drive circuit 63 turns ON or OFF the switching elements in response to the second control signal Sc2 to convert the DC power supplied from the on-board power supply into three-phase AC power, and supplies the three-phase AC power to the second winding group 43 via the second connection lines 45. Thus, the second control unit 61 controls a torque to be generated in the second winding group 43 through the supply of the driving electric power to the second winding group 43.

Next, description is given of calculation of the first control signal Sc1 by the first microcomputer 52 and calculation of the second control signal Sc2 by the second microcomputer 62. The first microcomputer 52 and the second microcomputer 62 calculate the first control signal Sc1 and the second control signal Sc2, respectively, by executing arithmetic processing operations indicated by the following control blocks in every predetermined calculation period.

The first microcomputer 52 and the second microcomputer 62 communicate with each other. The vehicle speed SPD, the first prioritized detection signal Sy1 (steering torque Th1), the second prioritized detection signal Sy2 (steering torque Th1), the rotation angle θ1, and the actual current values Iu1, Iv1, and Iw1 are input to the first microcomputer 52. The first microcomputer 52 outputs the first control signal Sc1 based on those condition amounts and condition amounts acquired from the second microcomputer 62. The vehicle speed SPD, the first redundant detection signal Sj1 (steering torque Th2), the second redundant detection signal Sj2 (steering torque Th2), the rotation angle θ2, and the actual current values Iu2, Iv2, and Iw2 are input to the second microcomputer 62. The second microcomputer 62 outputs the second control signal Sc2 based on those condition amounts and condition amounts acquired from the first microcomputer 52.

Figure 3:
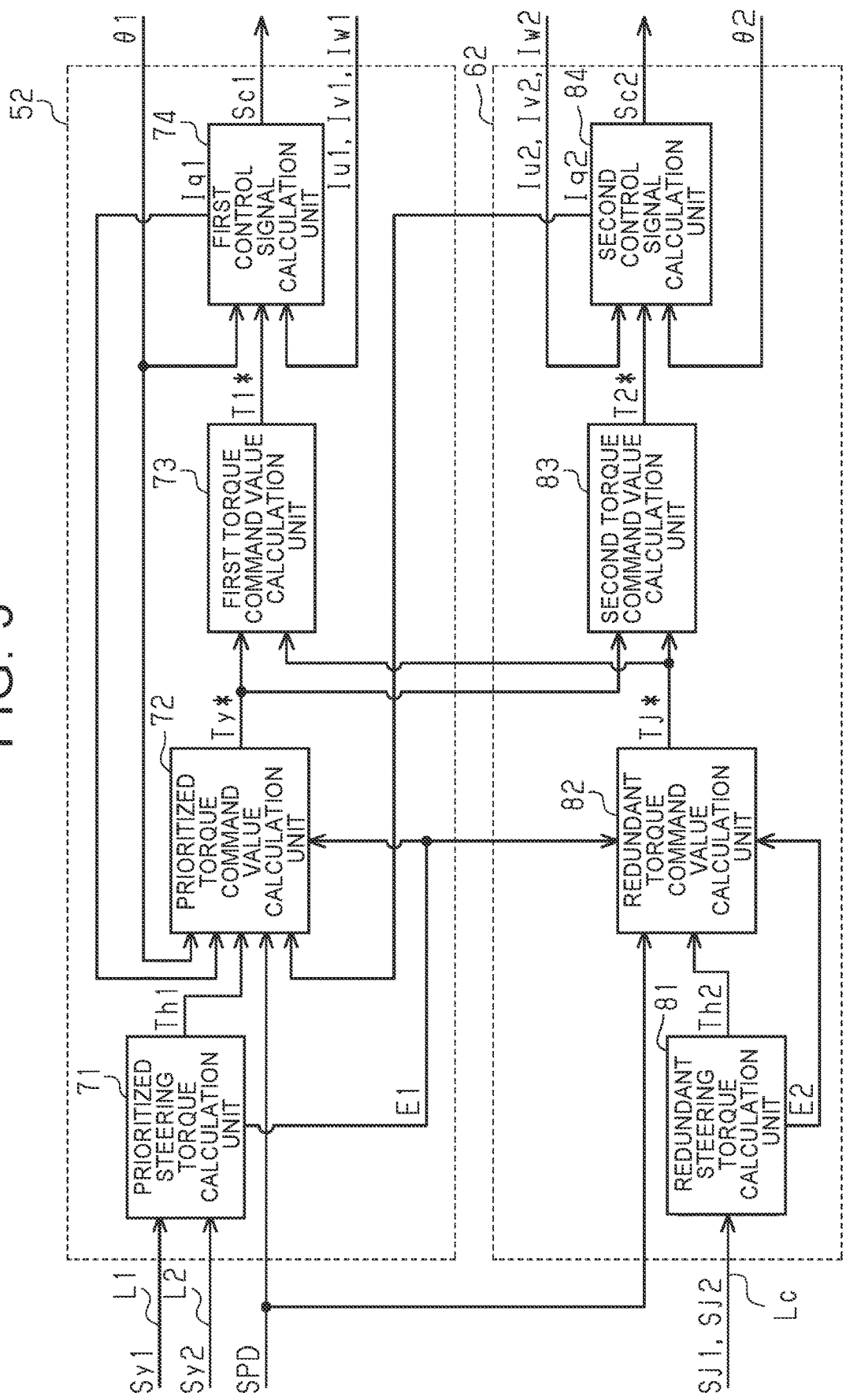
FIG. 3 is a block diagram of a first microcomputer and a second microcomputer.

Specifically, as illustrated in FIG. 3, the first microcomputer 52 includes a prioritized steering torque calculation unit 71 configured to calculate the steering torque Th1 detected by the prioritized torque sensor 32. The first microcomputer 52 further includes a prioritized torque command value calculation unit 72 and a first torque command value calculation unit 73. The prioritized torque command value calculation unit 72 calculates a prioritized torque command value Ty* that is a target value of the assist torque (motor torque) to be generated in the motor 21. The first torque command value calculation unit 73 calculates a first torque command value T1* of a torque to be generated in the first winding group 42 based on the prioritized torque command value Ty* or a redundant torque command value described later. The first microcomputer 52 further includes a first control signal calculation unit 74 configured to calculate the first control signal Sc1.

The first prioritized detection signal Sy1 and the second prioritized detection signal Sy2 are input to the prioritized steering torque calculation unit 71. As described later, the prioritized steering torque calculation unit 71 detects the steering torque Th1 and detects an abnormality of the prioritized torque sensor 32 based on those condition amounts. When no abnormality occurs in the prioritized torque sensor 32, the prioritized steering torque calculation unit 71 outputs the steering torque Th1 to the prioritized torque command value calculation unit 72. When the abnormality occurs in the prioritized torque sensor 32, the prioritized steering torque calculation unit 71 outputs an abnormality detection signal E1 indicating the occurrence of the abnormality to the prioritized torque command value calculation unit 72 and the second microcomputer 62.

The steering torque Th1, the vehicle speed SPD, q-axis current values Iq1 and Iq2, the rotation angle θ1, and the abnormality detection signal E1 are input to the prioritized torque command value calculation unit 72. As described later, when no abnormality occurs in the prioritized torque sensor 32, the prioritized torque command value calculation unit 72 calculates the prioritized torque command value Ty* based on the steering torque Th1 detected by the prioritized torque sensor 32. When the abnormality occurs in the prioritized torque sensor 32, the prioritized torque command value calculation unit 72 does not calculate the prioritized torque command value Ty*. The prioritized torque command value Ty* may be calculated as a value indicating a torque or a value indicating a current. A redundant torque command value Tj*, the first torque command value T1*, and a second torque command value T2* described later may similarly be calculated as values indicating a torque or values indicating a current.

The prioritized torque command value Ty* or the redundant torque command value Tj* is input to the first torque command value calculation unit 73. The first torque command value calculation unit 73 of this embodiment sets a value that is a half (50%) of the prioritized torque command value Ty* or the redundant torque command value Tj* as the first torque command value T1*. The first torque command value T1* indicates a torque to be generated in the first winding group 42 so as to generate a torque indicated by the prioritized torque command value Ty* or the redundant torque command value Tj* in the motor 21.

The first torque command value T1*, the actual current values Iu1, Iv1, and Iw1, and the rotation angle θ1 are input to the first control signal calculation unit 74. The first control signal calculation unit 74 calculates a d-axis current command value Id1* on a d-axis and a q-axis current command value Iq1* on a q-axis in a d/q coordinate system based on the first torque command value T1*. In consideration of the fact that the absolute value of the torque to be generated in the first winding group 42 increases based on an increase in the absolute value of the current to be supplied to the first winding group 42, the first control signal calculation unit 74 calculates a q-axis current command value Iq1* having a larger absolute value as the absolute value of the first torque command value T1* increases. In this embodiment, the d-axis current command value Id1* on the d-axis is basically set to zero. The first control signal calculation unit 74 generates the first control signal Sc1 to be output to the first drive circuit 53 by executing current feedback control (for example, proportional-integral-derivative (PID) control) in the d/q coordinate system.

Specifically, the first control signal calculation unit 74 calculates a d-axis current value Id1 and the q-axis current value Iq1 that are actual current values of the first winding group 42 in the d/q coordinate system by mapping the actual current values Iu1, Iv1, and Iw1 on d/q coordinates based on the rotation angle θ1. Then, the first control signal calculation unit 74 calculates voltage command values based on current deviations on the d-axis and the q-axis so that the d-axis current value Id1 follows the d-axis current command value Id1* and the q-axis current value Iq1 follows the q-axis current command value Iq1*, and generates a first control signal (PWM signal) Sc1 having a duty ratio that is based on the voltage command values. By outputting the calculated first control signal Sc1 to the first drive circuit 53, the driving electric power is supplied to the first winding group 42 in response to the first control signal Sc1. Thus, the torque indicated by the first torque command value T1* is generated in the first winding group 42. The q-axis current value Iq1 that is calculated in the process of generating the first control signal Sc1 and is an actual current value of a current supplied to the first winding group 42 is output to the prioritized torque command value calculation unit 72.

The second microcomputer 62 is basically constructed similarly to the first microcomputer 52, and includes a redundant steering torque calculation unit 81 configured to calculate the steering torque Th2 detected by the redundant torque sensor 33. The second microcomputer 62 further includes a redundant torque command value calculation unit 82 and a second torque command value calculation unit 83. The redundant torque command value calculation unit 82 calculates the redundant torque command value Tj* that is a target value of the assist torque (motor torque) to be generated in the motor 21. The second torque command value calculation unit 83 calculates the second torque command value T2* of a torque to be generated in the second winding group 43 based on the prioritized torque command value Ty* or the redundant torque command value Tj*. The second microcomputer 62 further includes a second control signal calculation unit 84 configured to calculate the second control signal Sc2.

The first redundant detection signal Sj1 and the second redundant detection signal Sj2 are input to the redundant steering torque calculation unit 81. As described later, the redundant steering torque calculation unit 81 detects the steering torque Th2 and detects an abnormality of the redundant torque sensor 33 based on those condition amounts. When no abnormality occurs in the redundant torque sensor 33, the redundant steering torque calculation unit 81 outputs the steering torque Th2 to the redundant torque command value calculation unit 82. When the abnormality occurs in the redundant torque sensor 33, the redundant steering torque calculation unit 81 outputs an abnormality detection signal E2 indicating the occurrence of the abnormality to the redundant torque command value calculation unit 82.

The steering torque Th2, the vehicle speed SPD, and the abnormality detection signals E1 and E2 are input to the redundant torque command value calculation unit 82. As described later, when the abnormality occurs in the prioritized torque sensor 32 and when no abnormality occurs in the redundant torque sensor 33, the redundant torque command value calculation unit 82 calculates the backup redundant torque command value Tj* based on the steering torque Th2 detected by the redundant torque sensor 33. When the abnormalities occur both in the prioritized torque sensor 32 and in the redundant torque sensor 33, the motor 21 is stopped, and the assist torque is not applied.

The prioritized torque command value Ty* or the redundant torque command value Tj* is input to the second torque command value calculation unit 83. The second torque command value calculation unit 83 of this embodiment sets a value that is a half (50%) of the prioritized torque command value Ty* or the redundant torque command value Tj* as the second torque command value T2*. The second torque command value T2* indicates a torque to be generated in the second winding group 43 so as to generate the torque indicated by the prioritized torque command value Ty* or the redundant torque command value Tj* in the motor 21.

The second torque command value T2*, the actual current values Iu2, Iv2, and Iw2, and the rotation angle θ2 are input to the second control signal calculation unit 84. The second control signal calculation unit 84 calculates a d-axis current command value Id2* on the d-axis and a q-axis current command value Iq2* on the q-axis in the d/q coordinate system based on the second torque command value T2* through arithmetic processing similar to that of the first control signal calculation unit 74. In this embodiment, the d-axis current command value Id2* on the d-axis is basically set to zero. The second control signal calculation unit 84 generates the second control signal (PWM signal) Sc2 to be output to the second drive circuit 63 by executing current feedback control (for example, PID control) in the d/q coordinate system. By outputting the calculated second control signal Sc2 to the second drive circuit 63, the driving electric power is supplied to the second winding group 43 in response to the second control signal Sc2. Thus, the torque indicated by the second torque command value T2* is generated in the second winding group 43. The q-axis current value Iq2 that is calculated in the process of generating the second control signal Sc2 and is an actual current value of a current supplied to the second winding group 43 is output to the prioritized torque command value calculation unit 72.

Next, the configurations of the prioritized torque sensor 32 and the redundant torque sensor 33 are described. As illustrated in FIG. 2, the prioritized torque sensor 32 includes a first prioritized detector 91, a second prioritized detector 92, a first communication unit 93, and a second communication unit 94. The redundant torque sensor 33 includes a first redundant detector 101, a second redundant detector 102, and a common communication unit 103. The prioritized torque sensor 32 and the redundant torque sensor 33 include a common magnetic circuit (not illustrated) in which a magnetic flux changes depending on a twist of the torsion bar 35. The first prioritized detector 91, the second prioritized detector 92, the first redundant detector 101, and the second redundant detector 102 are arranged at substantially the same positions so as to detect the magnetic flux passing through the magnetic circuit. For example, the magnetic circuit may have a configuration described in JP 2016-194488 A, and is configured such that the magnetic flux passing through the magnetic circuit increases as the absolute values of the steering torques Th1 and Th2 increase.

The first prioritized detector 91 includes a magnetic sensor 95 and an analog-to-digital (A/D) converter 96. For example, the magnetic sensor 95 is constructed of a Hall element, and outputs an analog value Ay1 depending on the intensity of the detected magnetic flux. The A/D converter 96 generates a digital value Dy1 serving as a prioritized detection value by quantizing the analog value Ay1 output from the magnetic sensor 95 with a predetermined number of bits (for example, 16 bits). The first prioritized detector 91 outputs the digital value Dy1 to the first communication unit 93.

The second prioritized detector 92 is constructed similarly to the first prioritized detector 91, and includes a magnetic sensor 97 and an A/D converter 98. The magnetic sensor 97 is arranged so as to output, depending on the intensity of the detected magnetic flux, an analog value Ay2 having substantially the same absolute value as that of the magnetic sensor 95 and having an opposite sign to that of the magnetic sensor 95. The A/D converter 98 generates a digital value Dy2 serving as a prioritized detection value by quantizing the analog value Ay2 output from the magnetic sensor 97 with the same number of bits as that of the A/D converter 96. The second prioritized detector 92 outputs the digital value Dy2 to the second communication unit 94.

The first communication unit 93 generates the first prioritized detection signal Sy1 for transmitting the digital value Dy1 to the controller 3. The first communication unit 93 transmits the first prioritized detection signal Sy1 to the controller 3 (first control unit 51) via a first signal line L1 connecting the prioritized torque sensor 32 and the controller 3. The second communication unit 94 generates the second prioritized detection signal Sy2 for transmitting the digital value Dy2 to the controller 3. The second communication unit 94 transmits the second prioritized detection signal Sy2 to the controller 3 (first control unit 51) via a second signal line L2 connecting the prioritized torque sensor 32 and the controller 3. That is, in the steering system 1 of this embodiment, the first prioritized detection signal Sy1 and the second prioritized detection signal Sy2 can simultaneously be output to the controller 3 via the independent and dedicated signal lines (first signal line L1 and second signal line L2).

The first redundant detector 101 is constructed similarly to the first prioritized detector 91 and the second prioritized detector 92, and includes a magnetic sensor 104 and an A/D converter 105. The magnetic sensor 104 outputs an analog value Aj1 depending on the intensity of the detected magnetic flux. The A/D converter 105 generates a digital value Dj1 serving as a redundant detection value by quantizing the analog value Aj1 output from the magnetic sensor 104 with a smaller number of bits (for example, 12 bits) than those of the A/D converters 96 and 98 of the first prioritized detector 91 and the second prioritized detector 92. The first redundant detector 101 outputs the digital value Dj1 to the common communication unit 103.

The second redundant detector 102 is constructed similarly to the first redundant detector 101, and includes a magnetic sensor 106 and an A/D converter 107. In this embodiment, the magnetic sensors 95 and 97 have the same configurations as those of the magnetic sensors 104 and 106 in terms of the sensitivity and resolution of detection of the magnetic flux change. The magnetic sensor 106 is arranged so as to output, depending on the intensity of the detected magnetic flux, an analog value Aj2 having substantially the same absolute value as that of the magnetic sensor 104 and having an opposite sign to that of the magnetic sensor 104. The A/D converter 107 generates a digital value Dj2 serving as a redundant detection value by quantizing the analog value Aj2 output from the magnetic sensor 106 with the same number of bits as that of the A/D converter 105. The second redundant detector 102 outputs the digital value Dj2 to the common communication unit 103.

The common communication unit 103 generates the first redundant detection signal Sj1 for transmitting the digital value Dj1 to the controller 3 and the second redundant detection signal Sj2 for transmitting the digital value Dj2 to the controller 3. The common communication unit 103 transmits the first redundant detection signal Sj1 and the second redundant detection signal Sj2 alternately to the controller 3 (second control unit 61) via a single common signal line Lc connecting the redundant torque sensor 33 and the controller 3. That is, in the steering system 1 of this embodiment, the first redundant detection signal Sj1 and the second redundant detection signal Sj2 are sequentially output to the controller 3 via the common signal line Lc. As described above, the number of bits for quantizing each of the digital values Dy1 and Dy2 is larger than the number of bits for quantizing each of the digital values Dj1 and Dj2. Thus, the information amount of each of the digital values Dy1 and Dy2 is larger than that of each of the digital values Dj1 and Dj2.

Next, description is given of detection of the steering torque Th1 by the prioritized steering torque calculation unit 71 and detection of the steering torque Th2 by the redundant steering torque calculation unit 81. As illustrated in FIG. 3, the first prioritized detection signal Sy1 is input to the prioritized steering torque calculation unit 71 via the first signal line L1, and the second prioritized detection signal Sy2 is input to the prioritized steering torque calculation unit 71 via the second signal line L2. The prioritized steering torque calculation unit 71 detects the abnormality of the prioritized torque sensor 32 and detects the steering torque Th1 based on those signals.

Specifically, the prioritized steering torque calculation unit 71 detects the abnormality of the prioritized torque sensor 32 in consideration of the fact that the sum of the digital values Dy1 and Dy2 is substantially constant (zero) because the absolute values of the analog values Ay1 and Ay2 are substantially equal and the signs of the analog values Ay1 and Ay2 are opposite. For example, the prioritized steering torque calculation unit 71 calculates the sum of the digital value Dy1 contained in the first prioritized detection signal Sy1 and the digital value Dy2 contained in the second prioritized detection signal Sy2. Then, the prioritized steering torque calculation unit 71 determines whether the absolute value of the calculated sum is equal to or smaller than a preset threshold. When the absolute value of the sum is equal to or smaller than the threshold, the prioritized steering torque calculation unit 71 determines that the prioritized torque sensor 32 is normal. When the absolute value of the sum is larger than the threshold, the prioritized steering torque calculation unit 71 determines that the prioritized torque sensor 32 is abnormal, and does not detect the steering torque Th1. Then, the prioritized steering torque calculation unit 71 outputs the abnormality detection signal E1 indicating the result of the abnormality detection to the prioritized torque command value calculation unit 72 and the redundant torque command value calculation unit 82.

When the prioritized torque sensor 32 is normal, the prioritized steering torque calculation unit 71 detects the steering torque Th1 based on the digital values Dy1 and Dy2. Specifically, the prioritized steering torque calculation unit 71 of this embodiment calculates a mean value of the absolute values of the digital values Dy1 and Dy2, and calculates a steering torque Th1 having an absolute value that is based on a magnetic flux indicated by the mean value and having the sign of the digital value Dy1. The prioritized steering torque calculation unit 71 prestores a relationship between the magnetic flux and the steering torque. The calculated steering torque Th1 is output to the prioritized torque command value calculation unit 72.

The first redundant detection signal Sj1 and the second redundant detection signal Sj2 are input to the redundant steering torque calculation unit 81 via the common signal line Lc. The redundant steering torque calculation unit 81 detects the abnormality of the redundant torque sensor 33 and detects the steering torque Th2 based on those signals through arithmetic processing similar to that of the prioritized steering torque calculation unit 71. Then, the redundant steering torque calculation unit 81 outputs the abnormality detection signal E2 indicating a result of the abnormality detection or the steering torque Th2 to the redundant torque command value calculation unit 82.

Next, the configuration of the prioritized torque command value calculation unit 72 is described. The steering torque Th1, the vehicle speed SPD, the q-axis current values Iq1 and Iq2, the rotation angle θ1, and the abnormality detection signal E1 are input to the prioritized torque command value calculation unit 72. As described above, the prioritized torque command value calculation unit 72 calculates the prioritized torque command value Ty* when the abnormality detection signal E1 indicates that no abnormality occurs.

Figure 4:
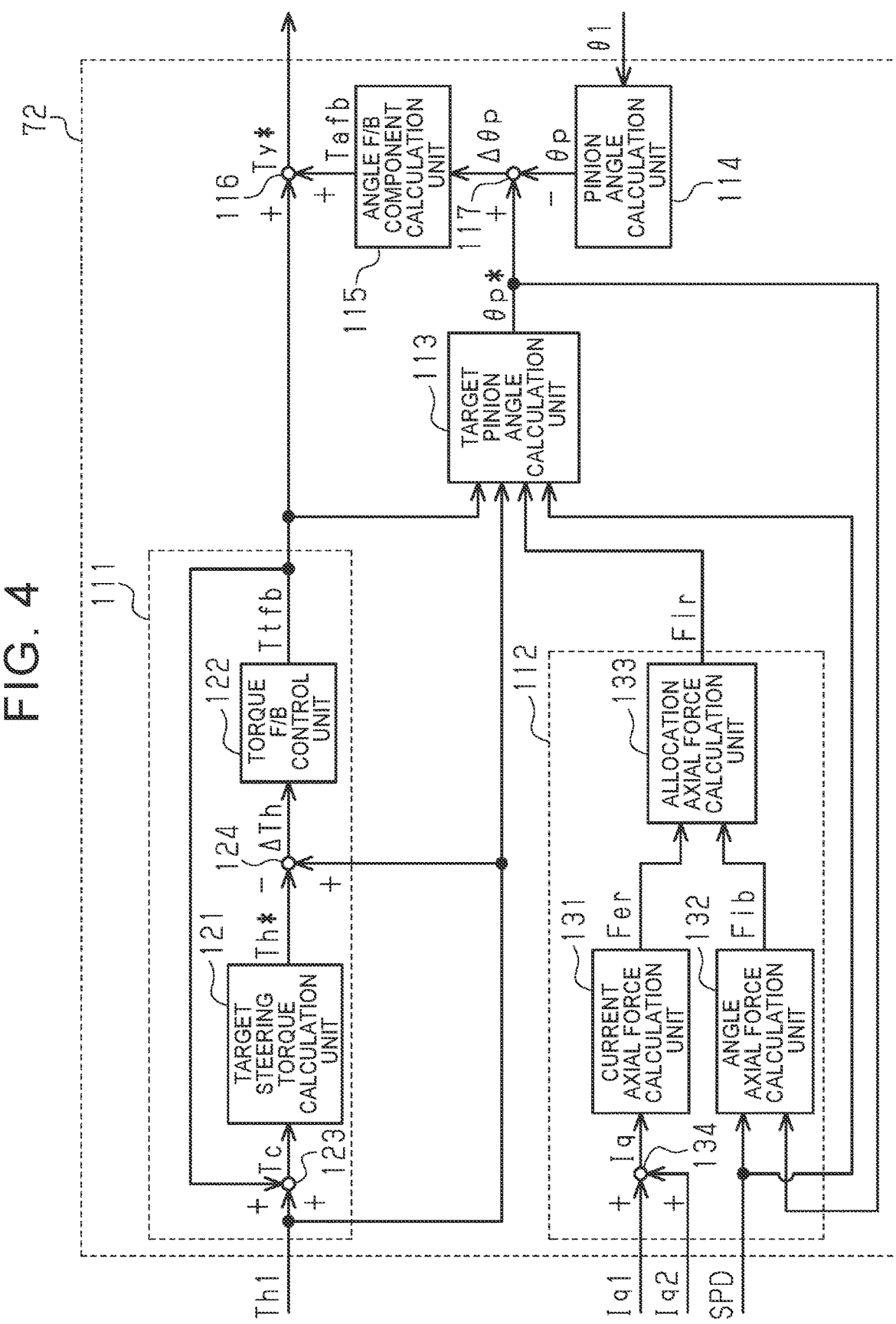
FIG. 4 is a block diagram of a prioritized torque command value calculation unit.

As illustrated in FIG. 4, the prioritized torque command value calculation unit 72 includes a torque feedback (hereinafter referred to as torque F/B) component calculation unit 111 and a reaction force component calculation unit 112. The torque F/B component calculation unit 111 calculates a torque F/B component Ttfb. The reaction force component calculation unit 112 calculates a reaction force component Fir. The prioritized torque command value calculation unit 72 further includes a target pinion angle calculation unit 113, a pinion angle calculation unit 114, and an angle feedback (hereinafter referred to as angle F/B) component calculation unit 115. The target pinion angle calculation unit 113 calculates a target pinion angle θp*. The pinion angle calculation unit 114 calculates a pinion angle θp. The angle F/B component calculation unit 115 calculates an angle F/B component Tafb. The prioritized torque command value calculation unit 72 calculates the prioritized torque command value Ty* based on the torque F/B component Ttfb and the angle F/B component Tafb.

Specifically, the torque F/B component calculation unit 111 includes a target steering torque calculation unit 121 and a torque F/B control unit 122. The target steering torque calculation unit 121 calculates a target steering torque Th*. The torque F/B control unit 122 calculates the torque F/B component Ttfb by executing torque F/B calculation. A driving torque Tc is input to the target steering torque calculation unit 121. The driving torque Tc is obtained by adding the torque F/B component Ttfb to the steering torque Th1 in an adder 123. The target steering torque calculation unit 121 calculates, based on the driving torque Tc, the target steering torque Th* that is a target value of the steering torque Th1 to be input by the driver relative to the driving torque Tc. Specifically, the target steering torque calculation unit 121 calculates a target steering torque Th* having a larger absolute value as the absolute value of the driving torque Tc increases.

A torque deviation ΔTh is input to the torque F/B control unit 122. The torque deviation ΔTh is obtained by subtracting the target steering torque Th* from the steering torque Th1 in a subtractor 124. The torque F/B control unit 122 calculates the torque F/B component Ttfb that is a force for assisting the steering operation by executing torque F/B control (for example, PID control) for causing the actual steering torque Th1 to follow the target steering torque Th*. The calculated torque F/B component Ttfb is output to the target pinion angle calculation unit 113 and adders 116 and 123.

The vehicle speed SPD, the q-axis current values Iq1 and Iq2, and the target pinion angle θp* are input to the reaction force component calculation unit 112. The reaction force component calculation unit 112 calculates the reaction force component Fir that is a force for resisting the steering operation based on those condition amounts.

Specifically, the reaction force component calculation unit 112 includes a current axial force calculation unit 131 and an angle axial force calculation unit 132. The current axial force calculation unit 131 calculates a current axial force (road axial force) Fer. The angle axial force calculation unit 132 calculates an angle axial force (ideal axial force) Fib. The current axial force Fer and the angle axial force Fib are calculated in terms of a dimension of the torque (N·m). The reaction force component calculation unit 112 includes an allocation axial force calculation unit 133 configured to calculate, as the reaction force component Fir, an allocation axial force obtained by allocating the current axial force Fer and the angle axial force Fib at a predetermined ratio so that an axial force applied to the steered wheels 5 from a road (road information transmitted from the road) is reflected.

A q-axis current value Iq is input to the current axial force calculation unit 131. The q-axis current value Iq is obtained by adding the q-axis current values Iq1 and Iq2 in an adder 134. The current axial force calculation unit 131 calculates, based on the q-axis current value Iq, the current axial force Fer that is an estimated value of the axial force applied to the steered wheels 5 (force transmitted to the steered wheels 5) and reflects the road information. Specifically, the current axial force calculation unit 131 calculates a current axial force Fer having a larger absolute value as the absolute value of the q-axis current value Iq increases under the assumption that the steering torque Th1 and the torque applied to the rack shaft 12 from the motor 21 are balanced with a torque depending on the force applied to the steered wheels 5 from the road. The calculated current axial force Fer is output to the allocation axial force calculation unit 133.

The target pinion angle θp* and the vehicle speed SPD are input to the angle axial force calculation unit 132. The angle axial force calculation unit 132 calculates, based on the target pinion angle θp*, the angle axial force Fib that is an ideal value of the axial force applied to the steered wheels 5 (force transmitted to the steered wheels 5) and does not reflect the road information. Specifically, the angle axial force calculation unit 132 calculates an angle axial force Fib having a larger absolute value as the absolute value of the target pinion angle θp* increases. The angle axial force calculation unit 132 also calculates an angle axial force Fib having a larger absolute value as the vehicle speed SPD increases. The calculated angle axial force Fib is output to the allocation axial force calculation unit 133.

The current axial force Fer and the angle axial force Fib are input to the allocation axial force calculation unit 133. A current allocation gain and an angle allocation gain are preset in the allocation axial force calculation unit 133 through experiments or the like. The current allocation gain indicates an allocation rate of the current axial force Fer. The angle allocation gain indicates an allocation rate of the angle axial force Fib. The allocation axial force calculation unit 133 calculates the reaction force component Fir by adding together a value obtained by multiplying the angle axial force Fib by the angle allocation gain and a value obtained by multiplying the current axial force Fer by the current allocation gain. The calculated reaction force component Fir is output to the target pinion angle calculation unit 113.

The steering torque Th1, the vehicle speed SPD, the torque F/B component Ttfb, and the reaction force component Fir are input to the target pinion angle calculation unit 113. The target pinion angle calculation unit 113 calculates, based on those condition amounts, the target pinion angle θp* as a target rotation angle of the pinion shaft 17. The target rotation angle is convertible into the steered angle of each of the steered wheels 5. Specifically, the target pinion angle calculation unit 113 calculates the target pinion angle θp* by using a model (steering model) expression showing a relationship between an input torque Tin* and the target pinion angle θp*. The input torque Tin* is a value obtained by adding the steering torque Th1 to and subtracting the reaction force component Fir from the torque F/B component Ttfb.

$$Tin^* = C \cdot \theta p^{*\prime} + J \cdot \theta p^{*\prime\prime} \quad (1)$$

The model expression defines a relationship between a torque and a rotation angle of the rotation shaft that rotates along with rotation of the steering wheel 4. The model expression is represented by using a coefficient of viscosity C obtained by modeling friction of the steering apparatus 2 or the like and a coefficient of inertia J obtained by modeling inertia of the steering apparatus 2. The coefficient of viscosity C and the coefficient of inertia J are variably set depending on the vehicle speed SPD. The calculated target pinion angle θp* is output to a subtractor 117 and the reaction force component calculation unit 112.

The rotation angle θ1 is input to the pinion angle calculation unit 114. The pinion angle calculation unit 114 calculates the pinion angle θp indicating the rotation angle (steering angle) of the pinion shaft 17 based on the rotation angle θ1. Specifically, the pinion angle calculation unit 114 sums up (counts) the number of revolutions of the motor 21 while defining the origin (zero degrees) at a pinion angle θp in a state in which, for example, the rack shaft 12 is at a neutral position where the vehicle travels straightforward, and calculates the pinion angle θp based on the number of revolutions and the rotation angle θ1 as an absolute angle including a range over 360°. The calculated pinion angle θp is output to the subtractor 117.

An angle deviation Δθp is input to the angle F/B component calculation unit 115. The angle deviation Δθp is obtained by subtracting the pinion angle θp from the target pinion angle θp* in the subtractor 117. The angle F/B component calculation unit 115 calculates the angle F/B component Tafb that is a force for assisting the steering operation by executing angle F/B control (for example, PID control) for causing the actual pinion angle θp to follow the target pinion angle θp*. The calculated angle F/B component Tafb is output to the adder 116.

The prioritized torque command value calculation unit 72 calculates, as the prioritized torque command value Ty*, a value obtained by adding the angle F/B component Tafb to the torque F/B component Ttfb in the adder 116, and outputs the prioritized torque command value Ty* to the first torque command value calculation unit 73 and the second torque command value calculation unit 83.

Next, the configuration of the redundant torque command value calculation unit 82 is described. As illustrated in FIG. 3, the steering torque Th2, the vehicle speed SPD, and the abnormality detection signals E1 and E2 are input to the redundant torque command value calculation unit 82. As described above, the redundant torque command value calculation unit 82 calculates the redundant torque command value Tj* when the abnormality detection signal E1 indicates that the abnormality occurs and when the abnormality detection signal E2 indicates that no abnormality occurs.

Specifically, the redundant torque command value calculation unit 82 calculates a redundant torque command value Tj* having a larger absolute value as the absolute value of the steering torque Th2 increases and as the vehicle speed SPD decreases. For example, a map showing a relationship between each of the steering torque Th2 and the vehicle speed SPD and the redundant torque command value Tj* is preset in the redundant torque command value calculation unit 82. The redundant torque command value calculation unit 82 calculates the redundant torque command value Tj* by referring to the map.

As described above, the prioritized torque command value calculation unit 72 calculates the prioritized torque command value Ty* by executing various types of calculation such as the torque F/B calculation and the angle F/B calculation. The redundant torque command value calculation unit 82 calculates the redundant torque command value Tj* by executing only the map calculation using the steering torque Th2 and the vehicle speed SPD as parameters. That is, the number of arithmetic processing operations for calculating the redundant torque command value Tj* by the redundant torque command value calculation unit 82 and the number of condition amounts for use in the calculation are smaller than the number of arithmetic processing operations for calculating the prioritized torque command value Ty* by the prioritized torque command value calculation unit 72 and the number of condition amounts for use in the calculation.

Next, actions and effects of this embodiment are described.

(1) In the steering system 1 of this embodiment, the first prioritized detection signal Sy1 and the second prioritized detection signal Sy2 are output from the prioritized torque sensor 32 to the controller 3 via the dedicated first signal line L1 and the dedicated second signal line L2, respectively. Therefore, the time required to transmit the first prioritized detection signal Sy1 and the second prioritized detection signal Sy2 can be shortened as compared to a case where the first prioritized detection signal Sy1 and the second prioritized detection signal Sy2 are transmitted collectively through a single signal line. Thus, a time required to acquire the steering torque Th1 by the controller 3 can be shortened.

When the steering torque Th2 is detected based on the first redundant detection signal Sj1 and the second redundant detection signal Sj2 output from the redundant torque sensor 33, that is, when the abnormality occurs in the prioritized torque sensor 32, the steering torque Th2 is used only in a limited period until the prioritized torque sensor 32 is repaired or replaced. Therefore, shortening a time, which is required to acquire the steering torque Th2, to optimize the steering feel is not required at a high level. In this embodiment, the first redundant detection signal Sj1 and the second redundant detection signal Sj2 are output from the first redundant detector 101 and the second redundant detector 102 of the redundant torque sensor 33 to the controller 3 via the single common signal line Lc. Thus, structural complication caused by an increase in the number of signal lines can be suppressed while securing redundancy.

(2) The digital values Dy1 and Dy2 contained in the first prioritized detection signal Sy1 and the second prioritized detection signal Sy2 are larger than the digital values Dj1 and Dj2 contained in the first redundant detection signal Sj1 and the second redundant detection signal Sj2 in terms of the information amount depending on the twist of the torsion bar 35. Therefore, the actuation of the motor 21 can be controlled based on the highly accurate steering torque Th1. When the information amount of each of the digital values Dy1 and Dy2 increases, the time required to transmit the first prioritized detection signal Sy1 and the second prioritized detection signal Sy2 increases. By outputting the first prioritized detection signal Sy1 and the second prioritized detection signal Sy2 to the controller 3 via the dedicated first signal line L1 and the dedicated second signal line L2, respectively, as in this embodiment, a time required to acquire the steering torque Th1 detected by the prioritized torque sensor 32 by the controller 3 can be shortened.

(3) The number of bits for quantizing each of the analog values Ay1 and Ay2 by the A/D converters 96 and 98 of the first prioritized detector 91 and the second prioritized detector 92 is larger than the number of bits for quantizing each of the analog values Aj1 and Aj2 by the A/D converters 105 and 107 of the first redundant detector 101 and the second redundant detector 102. Therefore, it is possible to suitably increase the information amount (resolution) of each of the digital values Dy1 and Dy2 to be contained in the first prioritized detection signal Sy1 and the second prioritized detection signal Sy2.

(4) The number of arithmetic processing operations for calculating the redundant torque command value Tj* by the redundant torque command value calculation unit 82 and the number of condition amounts for use in the calculation are smaller than the number of arithmetic processing operations for calculating the prioritized torque command value Ty* by the prioritized torque command value calculation unit 72 and the number of condition amounts for use in the calculation. Therefore, the time required to calculate the prioritized torque command value Ty* is longer than the time required to calculate the redundant torque command value Tj*. Thus, a time required to acquire the steering torque Th1 detected by the prioritized torque sensor 32 by the controller 3 can be shortened as in this embodiment.

(5) The prioritized torque command value calculation unit 72 calculates the prioritized torque command value Ty* by adding the torque F/B component Ttfb and the angle F/B component Tafb together. The prioritized torque command value Ty* is calculated based on the torque F/B component Ttfb obtained by executing the torque F/B control so that the actual steering torque Th1 follows the target steering torque. Therefore, the steering feel can be optimized by setting the steering torque Th1 to an optimum value. In the torque F/B control, the actual steering torque Th1 follows the target steering torque Th*, and therefore a time required to acquire the steering torque Th1 detected by the prioritized torque sensor 32 by the controller 3 can be shortened as in this embodiment.

This embodiment may be modified as follows. This embodiment and the following modified examples may be combined without causing any technical contradiction.

In the embodiment described above, the common communication unit 103 transmits the first redundant detection signal Sj1 and the second redundant detection signal Sj2 alternately to the controller 3 via the common signal line Lc. The applicable embodiment is not limited to this case. For example, a common detection signal containing the digital values Dj1 and Dj2 may be generated and transmitted via the common signal line Lc.

In the embodiment described above, the prioritized torque command value Ty* is calculated by adding the torque F/B component Ttfb and the angle F/B component Tafb together, and the target steering torque Th* when the torque F/B control is executed is calculated based on the driving torque Tc obtained by adding the steering torque Th1 and the torque F/B component Ttfb together. The applicable embodiment is not limited to this case. The calculation method may be changed as appropriate.

For example, a target steering torque may be calculated based on the reaction force component Fir, and a torque F/B component obtained by executing torque F/B control for causing the steering torque Th1 to follow the target steering torque may be calculated as the prioritized torque command value Ty*. Further, the prioritized torque command value Ty* need not be calculated based on the torque F/B component Ttfb. For example, a value obtained by adding together the angle F/B component Tafb and a basic component calculated based on the steering torque Th1 and the vehicle speed SPD may be calculated as the prioritized torque command value Ty*.

In the embodiment described above, the redundant torque command value Tj* is calculated based on the steering torque Th2 and the vehicle speed SPD. The applicable embodiment is not limited to this case. The calculation method may be changed as appropriate. In this case, actions and effects similar to the actions and effects in (4) are attained if the calculation is performed such that the number of arithmetic processing operations for calculating the prioritized torque command value Ty* is larger than the number of arithmetic processing operations for calculating the redundant torque command value Tj*. Further, the arithmetic processing for calculating the prioritized torque command value Ty* may be the same as the arithmetic processing for calculating the redundant torque command value Tj*.

In the embodiment described above, the number of bits for quantizing each of the analog values Ay1 and Ay2 by the A/D converters 96 and 98 of the first prioritized detector 91 and the second prioritized detector 92 may be equal to or smaller than the number of bits for quantizing each of the analog values Aj1 and Aj2 by the A/D converters 105 and 107 of the first redundant detector 101 and the second redundant detector 102.

In the embodiment described above, the magnetic sensors 95 and 97 of the first prioritized detector 91 and the second prioritized detector 92 may be higher or lower than the magnetic sensors 104 and 106 of the first redundant detector 101 and the second redundant detector 102 in terms of the sensitivity or resolution of detection of the magnetic flux change.

In the embodiment described above, the motor 21 includes the first winding group 42 and the second winding group 43 having two separate energization systems. The applicable embodiment is not limited to this case. The motor 21 may have a single energization system alone, or may include winding groups having three or more separate systems.

In the embodiment described above, the controller 3 includes the first control unit 51 including the first microcomputer 52 and the first drive circuit 53, and the second control unit 61 including the second microcomputer 62 and the second drive circuit 63. The applicable embodiment is not limited to this case. For example, the controller 3 may include a single microcomputer alone or a single drive circuit alone.

In the embodiment described above, the steering apparatus 2 is constructed as the EPS. The applicable embodiment is not limited to this case. For example, the steering apparatus 2 may be constructed as a steer-by-wire steering apparatus in which power transmission between a steering portion and a steered portion is separated, and control may be made over actuation of a motor configured to apply a steering operation torque for turning the steered wheels 5 based on the steering torques Th1 and Th2 detected by the prioritized torque sensor 32 and the redundant torque sensor 33, or actuation of a motor configured to apply a steering reaction force to the steering wheel 4 based on the steering torques Th1 and Th2.

Next, supplementary description is given of the technical ideas that can be grasped from the embodiment and the modified examples described above. In the steering system, the motor includes the winding groups having the plurality of separate energization systems. The controller includes the plurality of individual control units configured to independently control the supply of the driving electric power to the winding groups for the respective energization systems. One of the plurality of individual control units includes the prioritized torque command value calculation unit. The other one of the plurality of individual control units includes the redundant torque command value calculation unit.

What is claimed is:

1. A steering system, comprising:
a steering mechanism configured to turn a steered wheel in response to a steering operation;
a motor configured to apply a motor torque to the steering mechanism;
a prioritized torque sensor and a redundant torque sensor each configured to detect a steering torque based on a twist of a torsion bar provided on a steering shaft of the steering mechanism, the prioritized torque sensor including a first prioritized detector and a second prioritized detector each configured to output a prioritized detection value depending on the twist of the torsion bar, the redundant torque sensor including a first redundant detector and a second redundant detector each configured to output a redundant detection value depending on the twist of the torsion bar;
a controller configured to control actuation of the motor based on the steering torque;
a first signal line and a second signal line each connecting the prioritized torque sensor and the controller; and
a common signal line connecting the redundant torque sensor and the controller, wherein:
the prioritized torque sensor is configured to transmit, via the first signal line, a first prioritized detection signal containing the prioritized detection value output from the first prioritized detector;
the prioritized torque sensor is configured to transmit, via the second signal line, a second prioritized detection signal containing the prioritized detection value output from the second prioritized detector;
the redundant torque sensor is configured to transmit, via the common signal line, a first redundant detection signal and a second redundant detection signal containing the redundant detection values output from the first redundant detector and the second redundant detector, respectively; and
an information amount of each of the prioritized detection values contained in the first prioritized detection signal and the second prioritized detection signal is larger than an information amount of each of the redundant detection values contained in the first redundant detection signal and the second redundant detection signal.

2. The steering system according to claim 1, wherein:
each of the first prioritized detector, the second prioritized detector, the first redundant detector, and the second redundant detector includes:
a detection element configured to output an analog value depending on the twist of the torsion bar; and
an A/D converter configured to output a digital value obtained through A/D conversion of the analog value; and
a number of bits for quantizing the analog value by the A/D converter of each of the first prioritized detector and the second prioritized detector is larger than a number of bits for quantizing the analog value by the A/D converter of each of the first redundant detector and the second redundant detector.

3. The steering system according to claim 1, wherein:
the controller is configured to calculate a prioritized torque command value that is a target value of the motor torque based on the steering torque detected by the prioritized torque sensor;
the controller is configured to calculate a redundant torque command value that is a target value of the motor torque based on the steering torque detected by the redundant torque sensor;
the controller is configured to control the actuation of the motor so that the motor torque is a torque indicated by the prioritized torque command value or the redundant torque command value; and
a number of arithmetic processing operations for calculating the redundant torque command value by the controller is smaller than a number of arithmetic processing operations for calculating the prioritized torque command value by the controller.

4. The steering system according to claim 3, wherein:
the controller is configured to calculate a target steering torque that is a target value of the steering torque detected by the prioritized torque sensor;
the controller is configured to calculate a torque feedback component by executing torque feedback control for causing the steering torque detected by the prioritized torque sensor to follow the target steering torque; and
the controller is configured to calculate the prioritized torque command value based on the torque feedback component.

5. A steering system, comprising:
a steering mechanism configured to turn a steered wheel in response to a steering operation;
a motor configured to apply a motor torque to the steering mechanism;
a prioritized torque sensor and a redundant torque sensor each configured to detect a steering torque based on a twist of a torsion bar provided on a steering shaft of the steering mechanism, the prioritized torque sensor including a first prioritized detector and a second prioritized detector each configured to output a prioritized detection value depending on the twist of the torsion bar, the redundant torque sensor including a first redundant detector and a second redundant detector each configured to output a redundant detection value depending on the twist of the torsion bar;
a controller configured to control actuation of the motor based on the steering torque;
a first signal line and a second signal line each connecting the prioritized torque sensor and the controller; and
a common signal line connecting the redundant torque sensor and the controller, wherein:
the prioritized torque sensor is configured to transmit, via the first signal line, a first prioritized detection signal containing the prioritized detection value output from the first prioritized detector;
the prioritized torque sensor is configured to transmit, via the second signal line, a second prioritized detection signal containing the prioritized detection value output from the second prioritized detector;
the redundant torque sensor is configured to transmit, via the common signal line, a first redundant detection signal and a second redundant detection signal containing the redundant detection values output from the first redundant detector and the second redundant detector, respectively;

the controller is configured to calculate a prioritized torque command value that is a target value of the motor torque based on the steering torque detected by the prioritized torque sensor;

the controller is configured to calculate a redundant torque command value that is a target value of the motor torque based on the steering torque detected by the redundant torque sensor;

the controller is configured to control the actuation of the motor so that the motor torque is a torque indicated by the prioritized torque command value or the redundant torque command value; and a number of arithmetic processing operations for calculating the redundant torque command value by the controller is smaller than a number of arithmetic processing operations for calculating the prioritized torque command value by the controller.

6. The steering system according to claim 5, wherein:

the controller is configured to calculate a target steering torque that is a target value of the steering torque detected by the prioritized torque sensor;

the controller is configured to calculate a torque feedback component by executing torque feedback control for causing the steering torque detected by the prioritized torque sensor to follow the target steering torque; and the controller is configured to calculate the prioritized torque command value based on the torque feedback component.

* * * * *